United States Patent
Mumm et al.

(10) Patent No.: US 6,882,784 B2
(45) Date of Patent: Apr. 19, 2005

(54) BUFFER TUBES FOR FIBER OPTIC CABLES

(75) Inventors: Jeffrey H. Mumm, Marietta, GA (US); Christopher W. McNutt, Woodstock, GA (US); Jeffrey Scott Laws, Brownwood, TX (US)

(73) Assignee: Superior Essex Communications LP, Atlanta, GA (US)

( * ) Notice: Subject to any disclaimer, the term of this patent is extended or adjusted under 35 U.S.C. 154(b) by 0 days.

(21) Appl. No.: 10/660,149

(22) Filed: Sep. 11, 2003

(65) Prior Publication Data

US 2005/0058412 A1 Mar. 17, 2005

(51) Int. Cl.[7] .............................................. G02B 6/44
(52) U.S. Cl. ...................................................... 385/100
(58) Field of Search ................................... 385/100–114

(56) References Cited

U.S. PATENT DOCUMENTS

| | | | |
|---|---|---|---|
| 4,798,445 A | * | 1/1989 | Yamamoto et al. ......... 385/143 |
| 5,574,816 A | | 11/1996 | Yang et al. |
| 6,650,815 B1 | * | 11/2003 | Hawtof et al. ............... 385/128 |
| 2003/0228116 A1 | * | 12/2003 | Davis et al. ................. 385/109 |

FOREIGN PATENT DOCUMENTS

EP     1115017 A1    11/2001

OTHER PUBLICATIONS

Lorene Baccaro, Richard Black, Linda Nelson, "Characterization of alternate resins for fiber optic loose tubes", p. 145–150, USA.

* cited by examiner

*Primary Examiner*—Khiem Nguyen
(74) *Attorney, Agent, or Firm*—Steven L. Nichols; Robert L. Kelly; Rader, Fishman & Grauer

(57) ABSTRACT

A communication cable for transmitting various communication signals. The cable comprises buffer tubes for optical fiber cables that are robust, crush resistant, flexible, and cost effective. To obtain these properties, the buffer tubes contain a polymeric mixture of high impact polystyrene and styrene-butadiene-styrene. The polymeric mixture for the buffer tubes may also contain crystalline polystyrene and/or acrylonitrile-butadiene-styrene.

22 Claims, 1 Drawing Sheet

BUFFER TUBES FOR FIBER OPTIC CABLES

FIELD OF THE INVENTION

This invention generally relates to voice, video and data communication cables. More particularly, the invention relates to communication cables containing optical fibers. Even more particularly, this invention relates to buffer tubes for optical fiber cables.

BACKGROUND OF THE INVENTION

Communication cables containing optical fibers are generally used to transmit a variety of signals, including voice, video, and data signals. Optical fiber communication cables can be typically grouped into three main categories, which are distinguished by the location of the optical fibers within the cable. All three types of optical fiber cables contain an outer protective covering or polymeric jacket.

In the first category, loose tube fiber optic cables, the optical fibers lie in one or more buffer tubes that are placed about an elongated central strength member. Each of the buffer tubes usually includes a water-blocking material, such as a gel, that prevents moisture intrusion. Where the number of fiber cables is less than the maximum number than can be placed about the central strength member, the loose tube designs may include one or more flexible filler rods. The filler rods, which are typically fabricated from solid or cellular polymers, are wrapped about the central strength member, thereby minimizing the gaps between the central strength member and an outer protective covering or polymeric jacket.

The second and third categories of fiber optic cables are the monotube and slotted core cables, respectively. In monotube cables, the optical fibers are contained within a central buffer or core tube, which contains a water-blocking agent. In slotted core cables, the optical fibers reside in channels or grooves that have been formed on a surface of a rod-shaped polymeric core. The grooves typically follow a helical path along the surface of the core, thereby reducing compressive and tensile forces on the optical fibers whenever the cable is twisted, stretched, bent or compressed. The helical path traversed by the grooves may reverse direction at regular intervals along the cable's longitudinal axis, further reducing such forces acting on the optical fibers. In addition to a central strength member and water-blocking agent, which is disposed in each of the grooves, slotted core cables usually include a buffer tube that covers the slotted core.

Each of the fiber optic cables—loose tube, monotube, slotted core—may include other components, including reinforcing yarns and fibers, rip cords, and additional water-blocking materials (hot melts, water swellable powders, etc.). The fiber optic cables may also include helically wrapped tapes, corrugated armor and similar layers that help protect the optical fibers within the cable.

The buffer tube or core provides the primary protection for the optical fibers. As a result, the buffer tubes usually must exhibit good resistance to compressive, tensile and twisting forces (i.e., crush resistance), while also maintaining a flexibility over a wide range of temperatures. Other desirable properties of optical fiber cables include low cost and low moisture sensitivity, as well as good heat resistance, dimensional stability (e.g., low coefficient of thermal expansion) and chemical resistance.

Conventional buffer tubes are generally made of single layers of polymers and copolymers. Example of these polymers and copolymers include polypropylene (PP) and polyethylene (PE) polymers, copolymers of polyethylene and polypropylene including nucleated polypropylene and polyethylene (n-PP) copolymers, polyamides (PA) such as nylon 12, polybutylene terephthalate (PBT), polycarbonate (PC), fluoropolymers, polybutylene terephthalate, polyester elastomers, acetal resins and the like. Other buffer tube designs use multiple layers of these materials, such as a layer of PBT disposed on a layer of polycarbonate (PC).

Unfortunately, none of these materials is completely satisfactory. For example, PBT exhibits good crush resistance and is perhaps the most widely used material for buffer tubes. However, PBT has marginal flexibility, exhibiting a flexural modulus in excess of about 370 kpsi at room temperature. Though PBT can be treated to make it more flexible, such treatments increase the cost, making it less attractive for buffer tube applications. Additionally, PBT is susceptible to hydrolysis, which results in a loss of strength when exposed to moisture. Polyamides are also susceptible to hydrolysis and tend to be hygroscopic, negatively impacting their mechanical and electrical properties and their dimensional stability.

SUMMARY OF THE INVENTION

The invention provides a communication cable for transmitting various communication signals. The cable comprises buffer tubes for optical fiber cables that are robust, crush resistant, flexible and cost effective. To obtain these properties, the buffer tubes contain a polymeric mixture of high impact polystyrene and styrene-butadiene-styrene. The polymeric mixture for the buffer tubes may also contain crystalline polystyrene and/or acrylonitrile-butadiene-styrene.

The invention includes a buffer tube for a communication cable comprising a polymer mixture with a flexural modulus ranging from about 150 to about 360 kpsi. The invention also includes a buffer tube for a communication cable comprising a polymer mixture comprising HIPS. The invention further includes a buffer tube for a communication cable comprising a polymer mixture containing HIPS and SBS. The invention still further includes communication cables containing such buffer tubes.

The invention includes a method of making a buffer tube for a communication cable, comprising providing a polymer mixture containing HIPS and SBS, melting the polymer mixture, and extruding the melted polymer mixture. The invention also includes a method for communicating, comprising providing a cable with a buffer tube comprising a polymer mixture of HIPS and SBS, and transmitting a signal over the cable.

BRIEF DESCRIPTION OF THE DRAWINGS

FIGS. 1–3 are views of several aspects of the communication cables and methods for making and using the same according to the invention, in which:

FIG. 1 shows a perspective side view of a loose tube optical cable in one aspect of the invention;

FIG. 2 shows a perspective side view of a monotube optical cable in one aspect of the invention; and FIG. 3 shows a perspective side view of a slotted core optical cable in one aspect of the invention.

FIGS. 1–3 illustrate specific aspects of the invention and are a part of the specification. Together with the following description, the figures demonstrate and explain the principles of the invention and are views of only particular—rather than complete—portions of the invention.

DETAILED DESCRIPTION OF THE INVENTION

The following description provides specific details in order to provide a thorough understanding of the invention. The skilled artisan, however, would understand that the invention can be practiced without employing these specific details. Indeed, the present invention can be practiced by modifying the illustrated system and method and can be used in conjunction with apparatus and techniques conventionally used in the industry. For example, the invention is described below for optical fiber cables, but could be modified for any other type of communications cable.

As noted above, the invention generally comprises buffer tubes for optical fiber cables that are robust, crush resistant, flexible and cost effective. In the aspect of the invention described below, these properties are obtained by using a polymeric mixture of high impact polystyrene and styrene-butadiene-styrene, optionally with crystalline polystyrene and/or acrylonitrile-butadiene-styrene. Any other mix of polymers achieving this same mixture of features could also be used in the invention.

Figure 1:
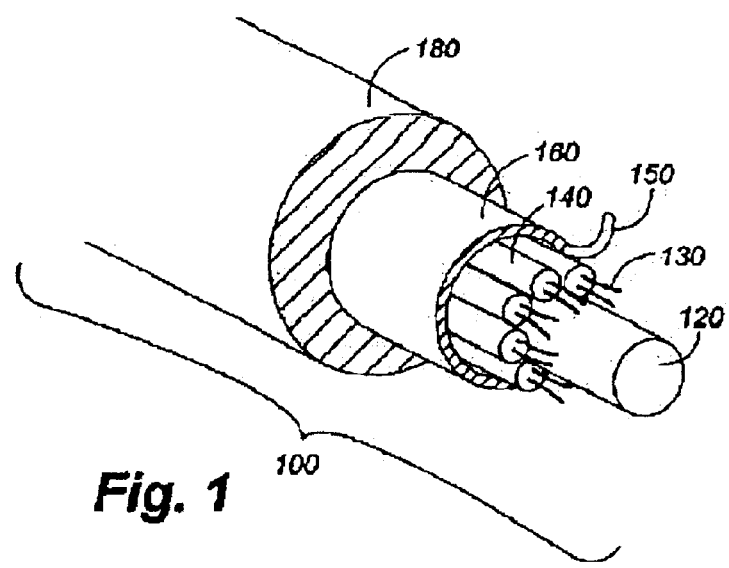

FIG. 1 illustrates a loose tube fiber optic cable (100) incorporating the buffer tubes of the invention. Typically, this structure incorporates a central strength member (120). A plurality of buffer tubes (140) are placed around the central strength member (120).
Optical fibers (130) are contained within the buffer tubes (140). When desired, the buffer tubes (140) can be filled with a gel as known in the art. Radial strength yarns (160) can be wrapped around the central strength member (120) and the buffer tubes (140). A ripcord (150) can be placed within the cable (100) so that the radial strength yarns (160) and outer layers can be at least partially removed to access the inner parts of the communications cable. Optionally, armor such as a metallic shield (not shown) can be placed around the central strength member (120), buffer tubes (140), and the yarns (160) to further protect the cable. Lastly, an outer jacket (180) is placed around the internal components of the cable (100).

Figure 2:
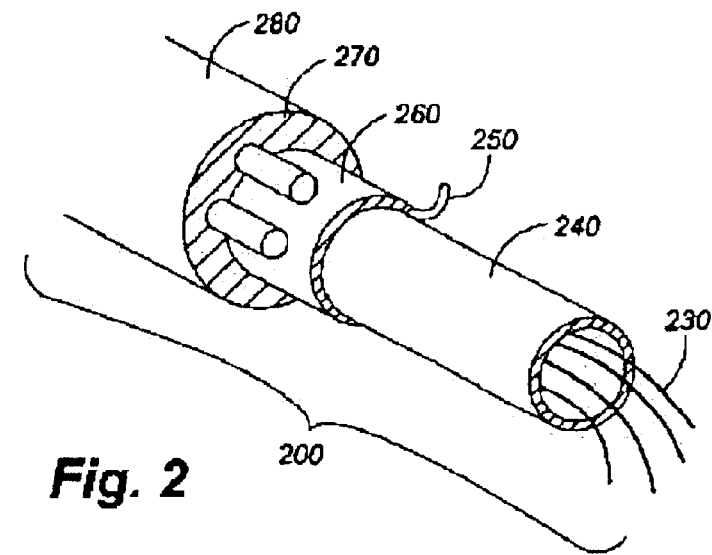

FIG. 2 illustrates a monotube fiber optic cable (200) incorporating the buffer tubes of the invention. The central core tube (240) contains optical fibers (230). As well, the buffer tube (240) may contain a gel as known in the art. Radial strength yarns (260) are wrapped around the central core tube (240). A ripcord (250) can be placed within the cable (200) so that the radial strength yarns (260) and outer layers can be at least partially removed to access the inner parts of the communications cable. Strength members (270) are placed around the yarns (260) and central core tube (240). The strength members (270) may be placed into different positions within the cable structure. Additionally, armor (not shown) can be placed around the central core tube (240) and the yarn (260) to further protect the cable. Lastly, an outer jacket (280) is placed around the internal components of the cable (200).

Figure 3:
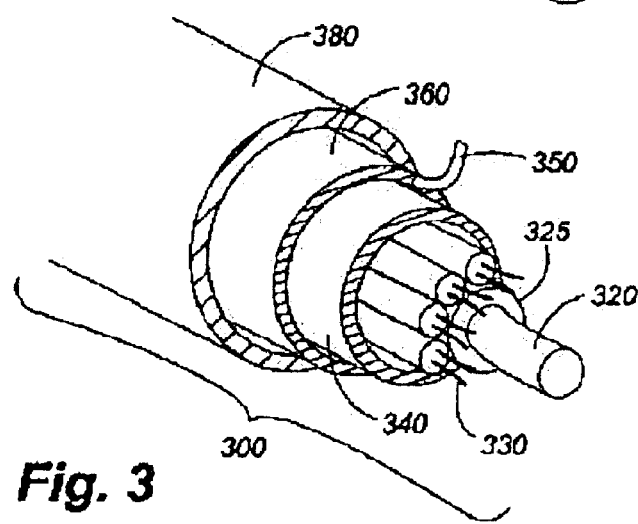

FIG. 3 illustrates a slotted core optical fiber cable (300) containing the buffer tubes of the invention. In cable (300), a slotted core (325) surrounds a central strength member (320). The slotted core (325) contains optical fibers (330) and the slotted core (325), in turn, is contained within a buffer tube (340). The buffer tube (340) may also contain a gel as known in the art. A radial strength yarn (360) is wrapped around the buffer tube (340), slotted core (325), and the central strength member (320). A ripcord (350) can be placed in a position such that the radial strength yarns (360) and other outer layers can be partially or fully removed to access the inner portion of the cable (300). Additionally, armor (not shown) can be placed around the central strength member (320), buffer tube (340), and the yarn (360) to further protect the cable. Lastly, an outer jacket (380) is placed around the internal components of the cable (300).

As depicted in FIGS. 1–3, the communication cables all contain a plurality of buffer tubes enclosing the optical fibers. Each buffer tube contains at least one optical fiber that transmits information such as voice and data signals. Each of the buffer tubes is also filled with a gel which functions to limit moisture intrusion into the interior of the buffer tubes, preventing or reducing contact with the optical fiber.

Each of the buffer tubes (140) is made of a mixture of polymers. The mixture of polymers must exhibit the combination of properties mentioned above. In particular, the polymeric mixture must also have a flexular modulus ranging from about 150 to about 360 kpsi. In one aspect of the invention, the polymeric mixture must have a flexular modulus ranging from about 180 to about 280 kpsi. The polymeric mixture may contain a homopolymer, a copolymer, or a mixture thereof. The copolymer may be an alternating copolymer, a random copolymer, a block copolymer, or a graft copolymer.

The first polymer of the polymeric mixture in one aspect of the invention is a polymer with a flexular modulus within the range indicated above. Examples of such polymers include crystalline polystyrene (CPS), acrylonitrile-butadiene-styrene (ABS), high impact polystyrene (HIPS), and styrene-acrylonitrile (SAN), styrene-maleic anhydride (SMA), styrene-methylmethacrylate (SMMA), as well as combinations and mixtures thereof. In one aspect of the invention, HIPS is used as this first component of the polymeric blend. HIPS is a copolymer with a polystyrene backbone and chains of polybutadiene grafted onto the backbone. The polystyrene gives the material strength, but the rubbery polybutadiene chains give it resilience to make it less brittle. The flexular modulus for HIPS is about 240 kpsi.

By itself, however, unmodified HIPS is too brittle to be used effectively in buffer tubes, especially at low temperatures. Thus, the second polymer of the polymer mixture in one aspect of the invention is any polymer that is compatible and/or miscible with HIPS. Examples of such polymers include those containing significant amounts of either styrene or butadiene, including styrene-isobutylene-styrene (SIS), styrene-ethylene-butylene-styrene (SEBS), and/or styrene-butadiene-styrene (SBS). In one aspect of the invention, SBS is used as the second polymer. SBS is a block copolymer made up of three segments. The first segment is a long chain of polystyrene, the middle segment is a long chain of polybutadiene, and the last segment is another long section of polystyrene. In another aspect of the invention, the second polymer is any polymer.

The amounts of the HIPS and SBS in the polymer mixture depend on the desired characteristics of the buffer tubes, as well as cost considerations. In one aspect of the invention, about 5 to about 25 vol % SBS is mixed with about 75 to about 95 vol % HIPS. In another aspect of the invention, about 5 to about 20 vol % SBS is mixed with about 80 to about 95 vol % HIPS. Mixing the polymers in these amounts produces buffer tubes with adequate cold temperature performance, yet with a flexular modulus in the desired range as detailed above. In addition, mixing the polymers in these amounts minimizes costs: buffer tubes made using these amounts cost about half as much as PBT buffer tubes.

In another aspect of the invention, additional polymers could be added to the polymer mixture used for the buffer tubes. Preferably, these additional polymers, when mixed with the polymers mentioned above, maintain the flexular modulus within the ranges detailed above. Examples of these additional polymers include ABS and CPS as described above, as well as mixtures thereof and combinations thereof. The amounts of these polymers will be determined by the desired characteristics of the buffer tubes, as well as cost considerations.

Another benefit of using such a polymeric mixture to make the buffer tubes is a lower shrinkage tendency. Many, if not all, of the polymers used in the polymeric mixture are amorphous and non-crystalline in nature. This nature allows for a broader range of acceptable processing conditions and produces cables with fewer shrinkage-related problems.

In addition to exhibiting chemical and heat resistance similar to conventional buffer tube materials, the polymeric mixture of the invention provides crush resistance and flexibility that are comparable, respectively, to PBT and polyolefins (e.g., polyethylene, polypropylene, and their copolymers). The polymer mixture of the invention achieves a good balance between crush resistance and flexibility by exhibiting a flexural modulus between that of PBT and polyolefinic materials. For example, the polymer mixture of the invention has a flexural modulus (at room temperature) of about 180 to about 280 kpsi. Under the same conditions, PBT exhibits a flexural modulus of about 377 kpsi and a nucleated copolymer PP (a desirable polyolefin) has a flexural modulus of about 180 kpsi.

The polymer mixture of the invention may be unfilled or filled (e.g., contain glass fiber, inorganic particles such as silica, talc, etc.) and may contain antioxidants, processing aids, and other additives. The polymer mixture can be made into buffer tubes using any technique that is suitable for processing thermoplastic resins. For example, the respective polymers may be mixed under heat and pressure to liquefy the resin and extruded through an annular die to form the tube.

The buffer tubes of the invention are not limited to merely being used in fiber optical cables, like those illustrated in FIGS. 1–3. The buffer tubes can also be used in hybrid cables that include optical fibers and metallic (e.g., copper) conductors.

Having described these aspects of the invention, it is understood that the invention defined by the appended claims is not to be limited by particular details set forth in the above description, as many apparent variations thereof are possible without departing from the spirit or scope thereof.

We claim:

1. A buffer tube for a communication cable, the buffer tube comprising a polymer mixture comprising HIPS.

2. The buffer tube of claim 1, wherein the polymer mixture also comprises SBS.

3. The buffer tube of claim 2, wherein the polymer mixture comprises about 80 to about 95 volume percent HIPS and about 5 to about 20 volume percent SBS.

4. The buffer tube of claim 1, wherein CPS, ABS or a combination thereof is used in place of the HIPS or in combination with the HIPS.

5. The buffer tube of claim 1, wherein SAN, SMA, SMMA or a combination thereof is used in place of the HIPS or in combination with the HIPS.

6. A buffer tube for a communication cable, the buffer tube comprising a polymer mixture containing HIPS and SBS.

7. The buffer tube of claim 6, wherein the polymer mixture has a flexural modulus ranging from about 150 to about 360 kpsi.

8. The buffer tube of claim 6, wherein the polymer mixture comprises about 80 to about 95 volume percent HIPS and about 5 to about 20 volume percent SBS.

9. A communication cable containing a buffer tube, the buffer tube comprising a polymer mixture comprising HIPS.

10. The cable of claim 9, wherein the polymer mixture also comprises SBS.

11. The cable of claim 10, wherein the polymer mixture comprises about 80 to about 95 volume percent HIPS and about 5 to about 20 volume percent SBS.

12. The cable of claim 9, wherein CPS, ABS or a combination thereof is used in place of the HIPS or in combination with the HIPS.

13. The cable of claim 9, wherein SAN, SMA, SMMA or a combination thereof is used in place of the HIPS or in combination with the HIPS.

14. A communication cable containing a buffer tube, the buffer tube comprising a polymer mixture containing HIPS and SBS.

15. The cable of claim 14, wherein the polymer mixture has a flexural modulus ranging from about 150 to about 360 kpsi.

16. The cable of claim 14, wherein the polymer mixture comprises about 80 to about 95 volume percent HIPS and about 5 to about 20 volume percent SBS.

17. A communications system containing a cable, the cable containing a buffer tube comprising a polymer mixture containing HIPS and SBS.

18. The system of claim 17, wherein the polymer mixture has a flexural modulus ranging from about 150 to about 360 kpsi.

19. The system of claim 17, wherein the polymer mixture comprises about 80 to about 95 volume percent HIPS and about 5 to about 20 volume percent SBS.

20. A method of making a buffer tube for a communication cable, comprising:

providing a polymer mixture containing HIPS and SBS;

melting the polymer mixture; and extruding the melted polymer mixture.

21. A method for communicating, comprising:

providing a cable with a buffer tube comprising a polymer mixture of HIPS and SBS; and transmitting a signal over the cable.

22. The buffer tube of claim 1, wherein the polymer mixture is filled, contains an antioxidant, contains a processing aid, or a combination thereof.

* * * * *